(No Model.)　　　　　　　　　　　　　　　　　　　　2 Sheets—Sheet 1.
W. T. VENABLE.
WASHING MACHINE.
No. 414,928.　　　　　　　　　Patented Nov. 12, 1889.
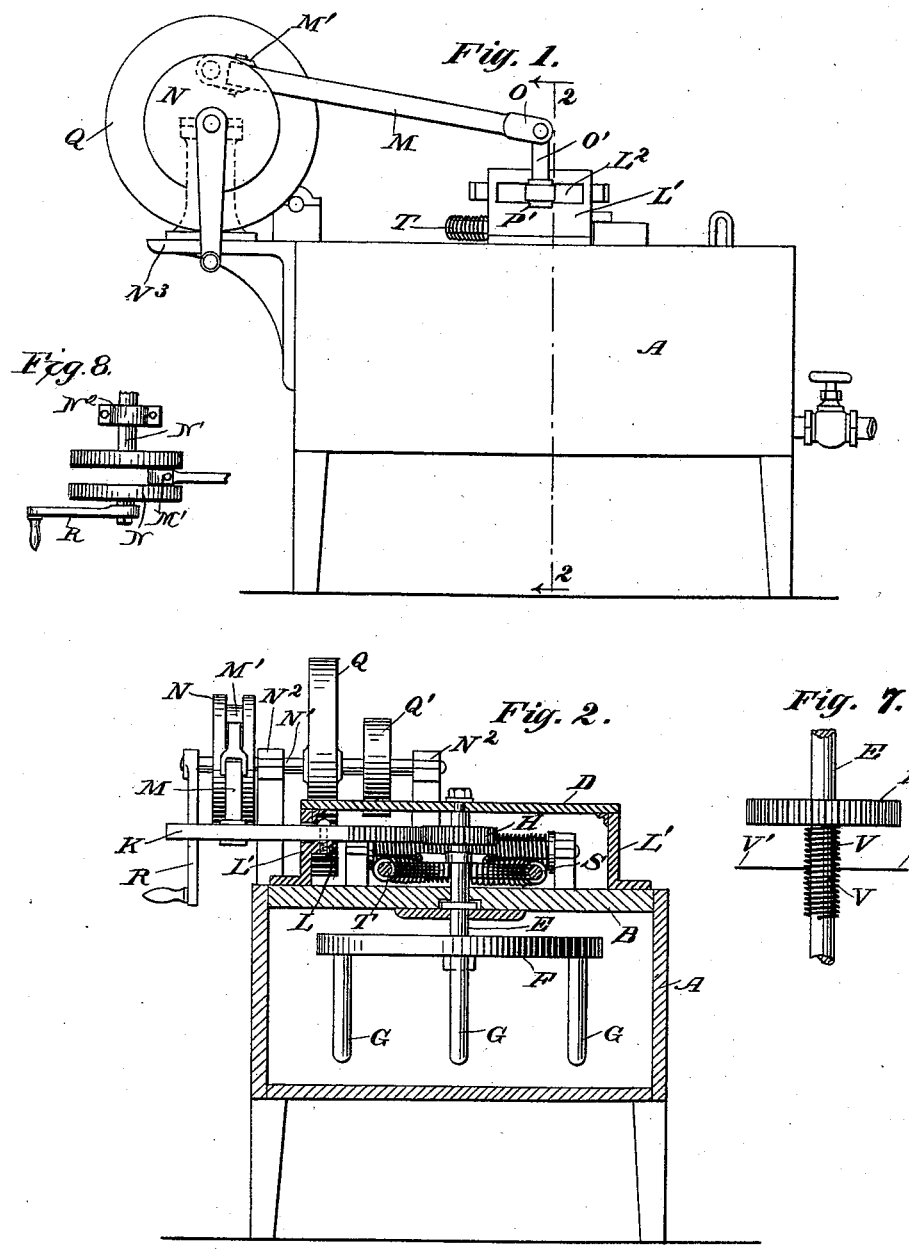
WITNESSES:　　　　　　　　　　　　　　　　INVENTOR
　　　　　　　　　　　　　　　　　　　　　W. T. Venable
　　　　　　　　　　　　　　　　　　BY
　　　　　　　　　　　　　　　　　　Munn & Co.
　　　　　　　　　　　　　　　　　　　　ATTORNEY (No Model.) 2 Sheets—Sheet 2.
W. T. VENABLE.
WASHING MACHINE.
No. 414,928. Patented Nov. 12, 1889.
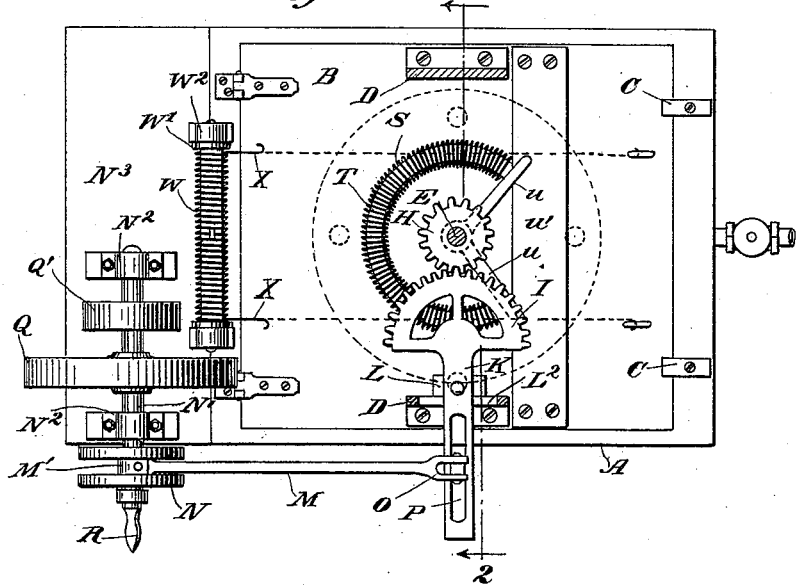
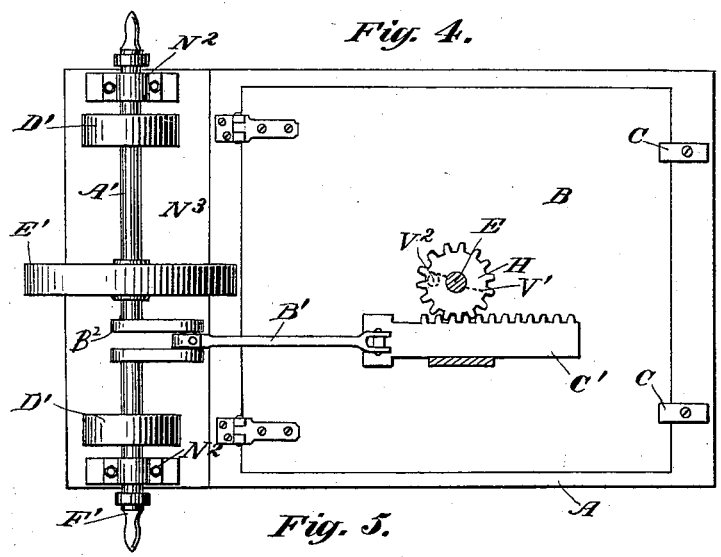
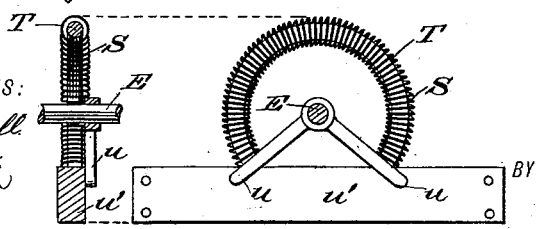
WITNESSES:
INVENTOR
W. T. Venable
BY
Munn & Co.
ATTORNEY

UNITED STATES PATENT OFFICE.

WILLIAM T. VENABLE, OF CHRISTIANSBURG, KENTUCKY.

WASHING-MACHINE.

SPECIFICATION forming part of Letters Patent No. 414,928, dated November 12, 1889.

Application filed April 23, 1889. Serial No. 308,257. (No model.)

*To all whom it may concern:*

Be it known that I, WILLIAM T. VENABLE, of Christiansburg, in the county of Shelby and State of Kentucky, have invented a new and Improved Washing-Machine, of which the following is a full, clear, and exact description.

This invention relates to that class of washing-machines in which a rotary beater operates with a reciprocatory movement within a closed tank or receptacle, and has for its object to provide an effective machine of this kind in which the mechanism will easily and quickly operate and the strain on the parts be relieved.

The invention consists in a washing-machine and in details thereof, constructed and arranged as hereinafter described and claimed.

Reference is to be had to the accompanying drawings, forming a part of this specification, in which similar letters of reference indicate corresponding parts in all the figures.

Figure 1 is a side view of a washing-machine constructed in accordance with this invention. Fig. 2 is a vertical section thereof on the line 2 2, Figs. 1 and 3. Fig. 3 is a plan view. Fig. 4 is a plan view of a modification showing a different form of pitman and the spring acting on the cover, as shown in Fig. 3, omitted. Fig. 5 shows in transverse section and plan view the segmental ring with double-acting spring and the rotary shaft with arms bearing against the spring. Fig. 6 is a detail view of the pitman shown in Fig. 1, detached. Fig. 7 is a modification of the parts shown in Fig. 5, employing, in connection with the rotary shaft, two springs with movable ends serving as a double-acting spring; and Fig. 8 is a detail view of the double-crank wheel.

A indicates the tank or receptacle of the washing-machine constructed in accordance with this invention and provided with a hinged cover B, secured in closed position by any suitable fastening—as, for example, the buttons C. Journaled in the cover B and in a frame D, mounted on the cover, is a vertical shaft E, projecting downwardly from the cover into the receptacle A. On the lower end of the shaft E is rigidly mounted a disk F, provided on its under surface with depending wooden or metal arms or pins G, which serve to whirl the clothes about in the tub or receptacle A and agitate the water.

Upon the upper portion of the shaft E is mounted a pinion H, which may be geared with any suitable operating mechanism, and, as shown in Figs. 1, 2, and 3, preferably consisting of the following-described mechanism. Meshing with the pinion H is a toothed segment I, having an arm K pivoted between its ends to a lug or projection L on one of the uprights L' of the frame D, and extending through a slot $L^2$ in the upright L', and projecting beyond the side of the receptacle A. Referring to Figs. 1, 2, and 3, the toothed segment I is operated by means of a pitman M, having one end bolted in a forked block M', pivoted to a double-crank wheel N, mounted on a shaft N', resting in vertical bearings $N^2$ on a bracket shelf or extension $N^3$ on the side of the receptacle A. The other end of the pitman M is formed in the shape of a fork O, pivoted to a short vertical arm O', projecting through a slot P in the arm K, held in place by a nut P' on its lower end and adapted to slide back and forth in the slot P. Upon the shaft N' is mounted a fly-wheel Q and a band-wheel Q'. The shaft N' is provided with a crank-handle R, by means of which it may be driven. If desired, the shaft N' may be driven by any suitable power connected with the band-wheel Q'. It will thus be seen that by means of the foregoing-described mechanism the toothed segment I can be reciprocated, thereby imparting through its connection with the pinion H a rotary movement to the shaft E, disk F, and arms G.

To aid in the operation of the machine and give it an easy movement, besides avoiding the strain and shock brought to bear on the teeth of the gearing by the sudden reaction in the reciprocating movement of the disk F and arms G, a double-acting spring-connection for the rotary shaft is provided, constructed as follows: Located on the cover B, concentric with the shaft E, is a portion of a ring S, having its ends secured to the cover B and having mounted thereon a coiled spring T. Upon the shaft E adjacent to pinion H are mounted two arms *u*, which normally project over the ends of the segmental ring S, and are adapted to alternately vibrate over a supporting-plate $u'$ on the cover B and alternately compress the spring T.

By means of the construction just described, when the machine is operated, the arms $u$, moving with the shaft E, will each be caused to alternately press against and compress the spring T, thereby serving as an elastic buffer during the reciprocating movement of the segment I and pinion H, and not only serve to remove the strain and shock of the teeth of the latter, but also tend to facilitate and expedite the movement of the parts. The same effect may be obtained by means of the modifications shown in the detail view in Fig. 7, where, in lieu of the segmental ring S and spring T, springs V are mounted on the vertical shaft E with laterally-projecting ends $V'$ bearing against a roller $V^2$ on the cover B, as shown in dotted lines, Fig. 4, and serving as a double-acting spring.

In lieu of the operative mechanism heretofore described, the modifications shown in Fig. 4 may be employed, in which a crank-shaft $A'$ is connected, by means of a pitman $B'$, with a reciprocating rack-bar $C'$, meshing with the pinion H, the pitman $B'$ being pivoted at one end to a double-crank arm $B^2$ on the shaft $A'$. In this form the segmental ring S and spring T may be employed, or the springs V mounted on the shaft E. The shaft $A'$ is provided with band-pulleys $D'$, a fly-wheel $E'$, and a crank-handle $F'$.

In order to readily close the cover B, a coiled spring W may be rigidly mounted on a rod $W'$, located in brackets $W^2$ adjacent to the hinge portion of the cover B, the projecting ends X of the spring W bearing against the cover B, as shown in Figs. 2 and 3. As the shaft $N'$ and the several wheels thereon are mounted on the extension $N^3$, and the pitman M is pivoted to the driving-wheel N, the cover B may be readily raised and lowered on its hinges.

Having thus described my invention, what I claim as new, and desire to secure by Letters Patent, is—

1. In a washing-machine, a reciprocating shaft having stirring and agitating arms and a double-acting spring-buffer connected with and acting on the reciprocating shaft, substantially as shown and described.

2. In a washing-machine, a receptacle having a rotary shaft, with arms extending laterally therefrom, and a disk with stirring and agitating arms located in the receptacle, in combination with a segmental ring and a coiled spring mounted thereon and located concentrically with the rotary shaft, the lateral arms on the rotary shaft bearing against the ends of the coiled spring and alternately compressing the latter, substantially as shown and described.

3. A washing-machine consisting of the receptacle A, with hinged cover B, the extension or shelf $N^3$ on one side of the receptacle, the vertical rotary shaft E, projecting through cover B and having the disk F, with stirring-arms G, located in receptacle A, the segmental ring S, located on cover B concentrically with shaft E and having the coiled spring T, the pinion H and lateral arms $u$ on the upper portion of shaft E, the arms $u$ bearing against the ends of coiled spring T, the arm K, pivoted to cover B and having a slotted end projecting beyond the top of receptacle A, and a toothed segment I, meshing with pinion H, a shaft $N'$, mounted on extension $N^3$ and having the crank-handle R, driving-wheel N, fly-wheel Q, and band-wheel $Q'$, and a pitman M, connecting the wheel N with a vertical bar $O'$, movable in a slot P of the arm K, substantially as shown and described.

WILLIAM T. VENABLE.

Witnesses:
I. P. WILCOXSON,
J. W. WILCOXSON.